US011734588B2

(12) United States Patent
Baughman et al.

(10) Patent No.: US 11,734,588 B2
(45) Date of Patent: Aug. 22, 2023

(54) MANAGING DOMAIN COMPETENCE DURING A COMPUTING SESSION

(71) Applicant: International Business Machines Corporation, Armonk, NY (US)

(72) Inventors: Aaron Baughman, Cary, NC (US); Craig M. Trim, Ventura, CA (US); Jeremy R. Fox, Georgetown, TX (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 16/827,716

(22) Filed: Mar. 24, 2020

(65) Prior Publication Data

US 2021/0304024 A1    Sep. 30, 2021

(51) Int. Cl.
| | |
|---|---|
| *G06N 5/04* | (2023.01) |
| *G06F 16/958* | (2019.01) |
| *G06F 40/30* | (2020.01) |
| *H04L 67/50* | (2022.01) |
| *G06N 20/00* | (2019.01) |

(52) U.S. Cl.
CPC .............. *G06N 5/04* (2013.01); *G06F 16/972* (2019.01); *G06F 40/30* (2020.01); *H04L 67/535* (2022.05); *G06N 20/00* (2019.01)

(58) Field of Classification Search
CPC ........ G06N 5/04; G06N 20/00; G06F 16/972; G06F 40/30; H04L 67/535
USPC .......................................................... 706/11
See application file for complete search history.

(56) References Cited

U.S. PATENT DOCUMENTS

| | | | |
|---|---|---|---|
| 6,676,412 B1 | 1/2004 | Masterson | |
| 7,455,522 B2 | 11/2008 | Polanyi | |
| 8,457,967 B2 | 6/2013 | Audhkhasi | |
| 9,262,405 B1 | 2/2016 | Baliga | |
| 9,680,945 B1* | 6/2017 | Treves | H04W 4/21 |
| 9,830,636 B1* | 11/2017 | Story, Jr. | G06Q 30/0631 |
| 10,078,630 B1* | 9/2018 | Gupta | G06Q 50/01 |
| 10,268,728 B2 | 4/2019 | Keohane | |
| 2007/0067441 A1* | 3/2007 | Pomerantz | H04L 67/535 |
| | | | 709/224 |
| 2016/0180216 A1* | 6/2016 | Allen | G06N 5/02 |
| | | | 706/46 |
| 2017/0372628 A1 | 12/2017 | Weiss | |
| 2018/0268309 A1* | 9/2018 | Childress | G06F 40/237 |
| 2022/0012073 A1* | 1/2022 | Granot | H04L 67/10 |

OTHER PUBLICATIONS

"Content delivery network," Wikipedia, accessed Mar. 9, 2020, 12 pages. <https://en.wikipedia.org/wiki/Content_delivery_network.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Alan S Chou
(74) *Attorney, Agent, or Firm* — Donald J. O'Brien

(57) ABSTRACT

Utilization data of a computer by a user during a session is gathered. A domain in which the user is utilizing the computer during the session is identified as reflected by the utilization data. Competence data on how competent the user is with the domain is gathered. The competence data relates to how the user interacts with the computer during the session. A competence level of the user for the domain is determined based on the competence data.

17 Claims, 5 Drawing Sheets

MANAGING DOMAIN COMPETENCE DURING A COMPUTING SESSION

BACKGROUND

Products and careers are becoming increasingly interdisciplinary and global. For example, businesses are increasingly conducting operations between two (or more) different groups that have two (or more) dominant languages across two (or more) technical specialties. For another example, rather than a product that operates solely by mechanical means, or electrical means, or chemical means, it is increasingly likely that products operate via means that intersect between a plurality of disciplines. To facilitate these increasingly interdisciplinary and global efforts, the Internet has flooded with information on different disciplines.

SUMMARY

Aspects of the present disclosure relate to a method, system, and computer program product relating to identifying a domain in which a computer is being used during a session and therein determining a competence level of the user within the domain. For example, the method includes gathering utilization data of a computer by a user during a session. The method further includes identifying a domain in which the user is utilizing the computer during the session as reflected by the utilization data. The method further includes gathering competence data on how competent the user is with the domain. The competence data relates to how the user interacts with the computer during the session. The method further includes determining a competence level of the user for the domain based on the competence data. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
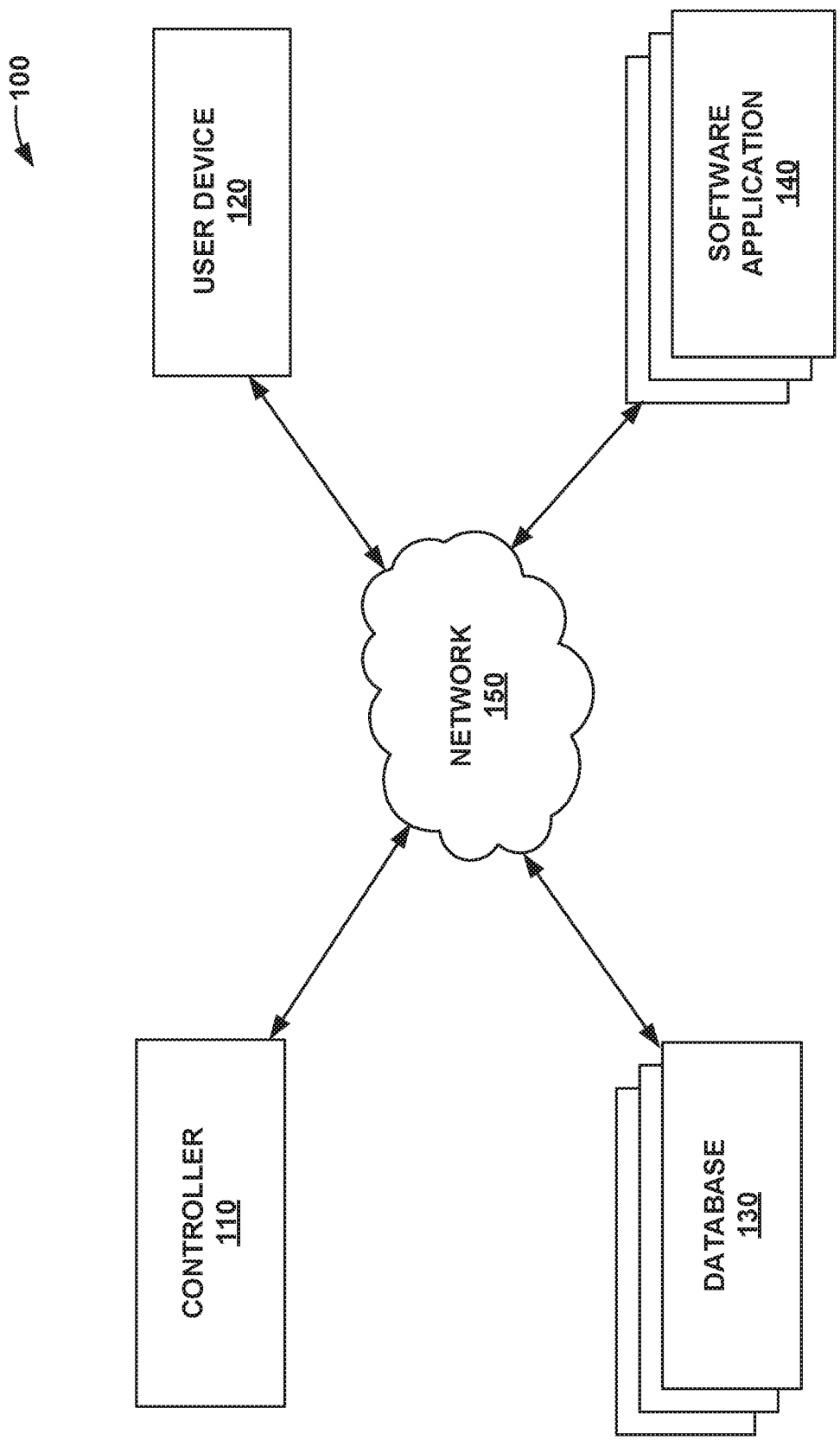
FIG. 1 depicts a conceptual diagram of an example system in which a controller may identify a domain in which a computer is being used during a session and therein determine a competence level of the user within the domain.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to monitoring competence levels of user, while more particular aspects of the present disclosure relate to identifying a domain in which a computer is being used during a session and therein determining a competence level of the user within the domain. While the present disclosure is not necessarily limited to such applications, various aspects of the disclosure may be appreciated through a discussion of various examples using this context.

When a user browses through a repository of data in a particular domain as saved on one or more computers, the user may experience times in which the data is either too complex or too rudimentary for the expertise of the user. This may be true whether a user is browsing a repository as presented by one or more locally saved software applications, browsing through the Internet, or browsing through any other collection of information saved on one or more computers. This full ecosystem of data across a geographically distributed network of proxy servers and respective data centers may be referred to as a content delivery network (CDN). A user may experience a situation where the data is too complex, for example, if the user is browsing in a domain of content in a particular language which is not the user's primary language, such that the repository of data may become too advanced (e.g., such that the user does not understand some overly technical language, obscure words, or grandiloquent phrases in the language). For another example, this may include a situation where the user is browsing in a very technical domain (e.g., a medical domain, a chemical domain, an electronical domain, or the like) in which the user is not fully versed.

In such examples, a conventional computer which the user is using to explore the CDN may be providing data which the user has little or no utility for. The user may have little or no use for the data as provided by the conventional computer as a result of some or all of the data being too advanced for the user to comprehend. The user may have to spend a substantial amount of time researching aspects of what the conventional computer is providing in order for this content to have utility for the user. For example, the user may spend a substantial amount of time looking up terms, understanding when terms are synonymous with each other, understanding when one repository states a now-outdated theory as a fact, or doing other such researching tasks. The conventional computer may have no way of identifying that the user is not "fluent" or competent enough within this domain for the content that is being provided by the conventional computer. Further, even were the conventional computer able to identify that the competence level of the user is not high enough for the provided content, the conventional computer may have no way of improving a manner of providing information to the user within this domain to better align with the competence level of the user.

Alternatively, in some examples the inverse may be true; a user may have an expertise in a domain such that a good chunk of the data as provided by a conventional computer may be rudimentary. For example, if a user is an expert in a technical field and this user is attempting to research a very specific topic within that field, it may be difficult for the user to browse through a webpage or article which goes into great depth on the whole field such that, e.g., only 5% of an article within that repository provides detail on that specific topic that is unknown to the user. In such examples, a user may attempt to browse through the other 95% of the article or webpage quickly to identify the 5%, but it may be relatively easy to miss some of the 5% amidst a mass of unnecessary rudimentary knowledge as provided by a conventional computer. In this example, a conventional computer may still have no way of identifying that the information that is provided by the conventional computer is rudimentary to the user, much less improve a way in which this data is provided.

Aspects of this disclosure are geared towards mitigating and/or solving these technical problems of conventional computers in providing data of a CDN to a user. For example, aspects of this disclosure are related towards identifying a domain in which a user is utilizing a computer, subsequently identifying a competence of the user within this domain, and therein potentially improving the manner in which this data may be consumed by the data according to this determined competence. A computing system that includes a processor that executes instructions saved on a memory (where these instructions relate to the operations described herein) may manage domain competence during a computing session as discussed herein. This computing system is predominantly referred to as a "controller" herein. The controller may identify a plurality of actions that indicate a competence of a user, such as the user looking up terms, spending more or less time on relatively complex or rudimentary portions of data, internet of things (IoT) data that indicates eye gaze or biometric data of the user, or the like.

Once the controller identifies the competence of the user, the controller may update the session for the user according to the determined competence. For example, if the controller determines that the user has less than a threshold competence (e.g., such that the user is not highly competent in the area), the controller may provide contextual information into the session. This may include offering translations to a primary language where the domain is a different language, offering definitions where the domain is a technical area, offering synonyms, removing idioms, expanding acronyms, identifying where alternative theories exist, identifying where a provided fact has been more recently disproven, or the like. Similarly, if the controller determines that the user has more than a threshold competence (e.g., such that the user is highly competent in the area), the controller may hide some remedial data, and/or present additional advanced data.

In some examples, the controller may thusly gather competence data and therein manage the domain competence of a user (by providing and/or hiding advanced and/or remedial information) during a single uninterrupted period of time (e.g., such that in this single period of time the controller identifies the domain, gathers the competence data, identifies the competence level, and updates the presentation of related media). In other examples, some or all of these operations of the controller may be divided over the course of numerous time periods over the course of numerous hours, days, or the like. For example, a controller may slowly identify a competence of a user within a domain over the course of three days as the user spends twenty minutes each day within this domain. After these three days, the controller may finally be able to identify a competence level with at least a threshold amount of confidence from the gathered competence data. From this point forward, whenever the controller detects that the user is back in this domain, the controller may manage the domain competence as described herein per this determined competence level (potentially updating a competence level of the user over time as the user learns more of the domain). In this way, even though aspects of this disclosure describe the controller managing domain competence in a single uninterrupted time period for purposes of clarity, it is to be understood that aspects of this disclosure relate to managing domain competence as described herein over any number of time periods that relate to an identified domain.

For example, FIG. 1 depicts system 100 in which controller 110 manages domain competence of a user that is using user device 120. Controller 110 may include a computing device, such as computing system 200 of FIG. 2 that includes a processor communicatively coupled to a memory that includes instructions that, when executed by the processor, causes controller 110 to execute one or more operations described below. User device 120 may include computing devices (e.g., devices similar to computing system 200 of FIG. 2) such as desktop computers, laptops, mobile phones, tablets, or the like.

In some examples, controller 110 may manage domain competence for a user only after receiving an opt-in from this user. Controller 110 may provide specific information to each user on which data controller 110 may access, how controller 110 will share and/or utilize this gathered data, how long granted permission lasts for, any manner in which functions of controller 110 may be monetized, and the like. In some examples, controller 110 may provide an opt-in suggestion for each respective functionality of controller 110 that is described herein.

Controller 110 may manage domain competence during discrete sessions. A session may relate to a time unit, such as a single hour, a single day, or the like. Alternatively, or additionally, a session may relate to times when a single known user is using user device 120, as determined by the primary user that is signed into user device 120 (e.g., where user device 120 is lockable and may be accessed by a plurality of users that each have a different account with user device 120). In some examples, a session may include an uninterrupted period of time during which a single user is using user device 120. In other examples, a session may include numerous different segments of time over the course of numerous days or hours that are associated together by the single user, a single topic, a single project being worked on, or the like.

Controller 110 may gather utilization data of user device 120 during this session. Controller 110 may gather utilization data in order to determine a domain in which the user is utilizing user device 120. In some examples, controller 110 may only evaluate data of a primary utilization during a session. As used herein, a primary utilization includes the primary "thrust" of utilization during the session. For example, if a user is on a computer for two hours and spends 100 minutes looking at medical data and 20 minutes looking at political news, controller 110 may determine the primary utilization to include the 100 minutes and not the 20 minutes. Put differently, where controller 110 determines that many disparate topics are consumed during a session, controller 110 may evaluate only one of these topics at a time (e.g., such that each topic is evaluated to be part of a single sub-session), and/or controller 110 may discard data that is not part of the aforementioned primary utilization.

This utilization data as gathered by controller 110 may include data of a user consuming data across a CDN. For example, controller 110 may gather utilization data of user device 120 accessing various databases 130 such as online repositories. These databases 130 may be accessed on user device 120 as a series of webpages that include data of the databases 130. Alternatively, or additionally, controller 110 may gather utilization data of user device 120 accessing one or more software applications 140. Software applications 140 may include software-as-a-service (SaaS) applications accessed via one or more web portals from user device 120. These SaaS software applications 140 may also be part of the CDN described herein. Where software applications 140 include SaaS functionality, software applications 140 may be hosted on one or more hosting servers. In other examples, software applications 140 may be saved locally on user device 120 (not depicted) and controller 110 may monitor their usage during the session.

In some examples, controller 110 may be part of a CDN that includes both databases 130 and software applications 140. For example, controller 110 may be part of a user-facing interface of a CDN that includes databases 130 and software applications 140 on a "back end" of the system. In this way, a single company may include an increasing number of data and/or software to this CDN, all of which is managed by controller 110 for domain competence as described herein.

Controller 110 may monitor user device 120 activity on databases 130 and software applications 140 over network 150. Network 150 may include the CDN described herein. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user devices 120, databases 130, and/or hosting servers that are hosting software applications 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may monitor conversations.

Controller 110 may analyze gathered utilization data to determine a domain in which user is utilizing user device 120. For example, controller 110 may utilize natural language processing (NLP) techniques described herein to determine a topic, language, area of expertise, and/or the like of the utilization data being consumed by the user (e.g., where data is consumed when that data is graphically or audibly provided by user device 120 to user). Controller 110 may analyze text (whether written or spoken) that is provided by databases 130 and/or software applications 140 to identify a domain. Alternatively, or additionally, controller 110 may analyze image data (including video data) to identify medical images, chemical structures, circuit diagrams, mechanical blueprints, or the like in identifying a domain.

For example, where controller 110 identifies that all subject matter consumed by the user was in Mandarin, controller 110 may identify the Mandarin language as a domain of the session. For another example, where controller 110 determines that subject matter consumed by the user was relating to heart disease, controller 110 may identify heart disease (or cardiovascular disease) as the domain. Controller 110 may further be configured to identify domains that are more leisure centric, rather than academic or professional in nature. For example, controller 110 may determine that a user session includes consuming a large number of webpages of databases 130 regarding the backstory or lore of a popular set of fiction books, therein identifying the framework of this work of fiction as the domain.

Once controller 110 identifies the domain, controller 110 may gather competence data of the user. The competence data may include data that indicates how competent the user is within the domain. As used herein, a user is understood to be "competent" within the domain when the user is both knowledgeable and comfortable within the domain, such that most or all of the data from databases 130 and/or software applications 140 as consumed by user on user device 120 is understood by the user in a relatively quick timeframe (e.g., relative to how quickly the user typically consumes data).

For example, controller 110 may identify if a user looks up terms presented by databases 130 and/or software applications 140 during the session. In general, controller 110 may identify a user looking up terms as indicating a relatively lower competence level of the user. In some examples, controller 110 may further identify this competence level based on how complex the terms are that are being looked up by the user. For example, if the domain is the German language and controller 110 detects the user looking up the word "hallo," controller 110 may identify that the user is at a relatively low competence level. Conversely, if the domain is the German language and controller 110 detects the user looking up the relatively less well-known word "Kummerspeck," controller 110 may identify that the user may be conversant (if not fluent) in this domain, such that the user has a moderate competence level.

In other examples, controller 110 may gather competence data that relates to a manner in which the user consumes the data. For example, controller 110 may identify a baseline at which the user typically consumes visual media, and may therein determine if the user is consuming media within the domain at a slower rate, a faster rate, or the same rate. If controller 110 determines that the user is consuming the media (e.g., by scrolling through the media, or clicking through the media, or listening to a podcast on the media at 1.5 speed, or the like) at a faster rate than is standard (for the user or otherwise), controller 110 may identify that the user has a relatively higher competence level. Conversely, if controller 110 identifies that the user is consuming the media slowly, controller 110 may identify that the user has a relatively low competence level.

In some examples, controller 110 may identify the competence level based on how the user interacts with the data as the data is presented to the user via user device 120. For example, controller 110 may gather competence data on where a cursor is while the media is being consumed (e.g., including which words are selected or highlighted by a cursor controlled by the user), gather data on where a user is gazing with their eyes during a session (e.g., as identified by a camera of user device 120), or the like. If controller 110 determines that the user is focusing on relatively rudimentary words, controller 110 may identify that the user has a relatively lower competence level in this domain. Conversely, if controller 110 determines that the user is focusing on relatively advanced words, controller 110 may identify that the user has a relatively higher competence level.

Controller 110 may monitor data that the user is providing to the webpages of databases 130 and/or to software applications 140 to identify a competence level of the user in the domain. For example, controller 110 may analyze commands, responses (to prompts), and the like as sent by user via user device 120 during the session. Controller 110 may use NLP techniques to determine whether or not these commands and responses are appropriate, such that they reflect a higher-level understanding within the domain. For example, if a field within software application 140 says "if you live in France, please enter your address here" in French, and controller 110 determines that the user provides a response of "no" (such that this response is not entirely appropriate), controller 110 may identify that a user has a relatively low competence level in this French language domain. Similarly, if controller 110 identifies that the user is checking boxes, selecting options, or otherwise interacting with webpages of databases 130 and/or software applications 140 in a manner that is illogical, incorrect, or otherwise suboptimal, controller 110 may identify that the user has a relatively lower competence level in the domain.

In certain examples, competence data as gathered by controller 110 may indicate how the user acts while consuming the media. For example, controller 110 may gather data from one or more Internet of Things (IoT) devices around the user as part of gathering competence data. This IoT data as gathered by controller 110 may include biometric data on the user. Using this biometric data, controller 110 may determine whether or not the user is calm (e.g., indicating that the domain is well known to the user such that the user is comfortable consuming it) or agitated (e.g., indicating that the user is struggling to comprehend the media) during the session. This biometric data may include heart rate, blood pressure, pupil size, or the like. In some examples, IoT data may also include visual data on stances, gestures, or actions of a user during the session. If controller 110 detects that the user has assumed a relatively relaxed and comfortable stance during the session, controller 110 may determine that the user has a relatively high competence level in this domain. Conversely, if controller 110 detects that the user is gesturing strongly at user device 120, if the user is getting up to pace during the session, or if the user is making other such pronounced movements, the controller 110 may determine that the user is more agitated as a result of a relatively lower competence level.

In certain examples, controller 110 may gather audio data as part of IoT data (e.g., from a microphone of user device 120). For example, controller 110 may gather competence data that includes whether or not the user is muttering, saying positive words, saying words that reflect agitation, or other such audible content from the user. Controller 110 may analyze this data as potentially indicating that the user has a relatively high competence level (e.g., when the user is emitting positive audible noises) or a relatively low competence level (e.g., when the user is emitting agitated noises).

Controller 110 may also gather work product of the user to determine competence data. For example, controller 110 may identify that the user is using user device 120 to create or work on a research paper, project, presentation, or the like within this domain. Controller 110 may use NLP techniques to analyze this work product, verifying whether or not statements created by the user are accurate, use industry appropriate terms, reflect modern understandings of the domain, or the like. Controller 110 may therein determine that the user has a relatively high or low competence level based on the understanding of the domain reflected by the work product.

The controller 110 may synthesize all of the gathered competence data together to get a single determined competence level of the user within the domain. For example, if the competence data indicates that the user is making agitated gestures and noises during the session but is otherwise perfectly interacting with and quickly consuming the media of the domain during the session, controller 110 may determine that the user has a relatively high competence level (e.g., and is perhaps agitated for other reasons). In some examples, controller 110 may weigh some factors higher than others. For example, controller 110 may weigh a factor of the user looking up terms higher than a factor of which words the user is highlighting while consuming the media. Controller 110 may use machine learning techniques as described herein to improve an ability of weighing factors that indicate competence for all users or given user over time.

Once controller 110 identifies the competence level of the user within the domain, controller 110 may modify the presentation of data by databases 130 and/or software applications 140 to reflect this identified competence level. For example, if controller 110 determines that the competence level of the user is below a threshold level of competence (e.g., that indicates that the user is at a relatively beginner level within this domain), controller 110 may present contextual information to the user. This may include translating some terms to a preferred domain of the user. For example, where the domain is "Mandarin" and the primary language of the user is English, controller 110 may translate some or all of the text of the domain media to English for the user. This may include superimposing the English terms over the Mandarin terms, causing English terms to appear adjacent Mandarin terms, or other such options.

Providing contextual information may also include identifying when information is provided by user device 120 (as stored in database 130 and/or software applications 140) as fact, but controller 110 determines that this information is instead only a theory, or is one among many theories, or has since been overruled, or the like. For example, if a lawyer who works in one area of law picks up a case in another area of law in which that lawyer is less competent, and then starts to research a case that is beneficial to that lawyer's case, controller 110 may detect that the lawyer has a competence level that is below a threshold. Controller 110 may therein subsequently alert the lawyer to that fact that this case has been overturned by a landmark case that is well-known by experts in this domain (e.g., such that the lawyer may not have needed to be informed of this landmark reversal had the lawyer been more competent in this domain). In this way, controller 110 may modify a manner in which data is provided to the user based on a detected amount of competence in respective domains.

Providing contextual information may also include identifying when different terms of a domain are synonymous. For example, controller 110 may identify that a user has a relatively low competence level in a domain of "circuitry." Controller 110 may have determined this, in part, from the user looking up the term "integrated circuit" after the user came across this term on a webpage of database 130. After this, controller 110 may detect the user reading another webpage of database 130 that uses the term "microchip." Controller 110 may provide a pop-up window or the like that details that the term microchip is essentially synonymous with the term integrated circuit.

In some examples, controller 110 may dynamically provide contextual information based on detected information from the user. For example, controller 110 may provide the pop-up that details that microchip is synonymous with integrated circuit after detecting an eye gaze of a user not moving away from microchip for a few seconds. Put differently, in some examples, controller 110 may be configured to additionally or only provide contextual information to a user with an identified low competence level in a domain in response to an indication that the user would benefit from this contextual information at the current time.

In other examples, where controller 110 determines that a user has a competence level above a threshold, controller 110 may present advanced information to the user during the session. Controller 110 may present this advanced information via a pop-up window, appear in unutilized space adjacent the media, appear via footnotes injected into the media, or the like. This advanced information may include information that may be helpful or interesting to a user with a relatively high competence level. For example, if controller 110 detects that a user with a high competency level in heart disease is researching cardiovascular treatment that includes a particular type of stent in a particular artery, controller 110 may also present additional information on medication that new research shows pairs well with this type of stent in this artery. Controller 110 may elect to not provide such advanced information to a user with a relatively lower competence level, as such a user may be less likely to properly contextualize this information.

Additionally, or alternatively, controller 110 may hide remedial information in response to determining that a user has a competency level that is above a threshold. This may include deleting or otherwise removing from view information that is remedial. This may also include concealing or reducing an emphasis on remedial information. For example, controller 110 may cause remedial information to have a strike-through, or be grayed out, or to be a smaller font size, or the like (e.g., such that the remedial information can both still be consumed but also is easy to identify as remedial and therein be skipped over). By thusly identifying a domain of a session, identifying a competency level of a user within that domain, and therein either providing contextual information or hiding remedial information according to that competency level, controller 110 may improve an ability of a computing system to provide information to a user.

Figure 2:
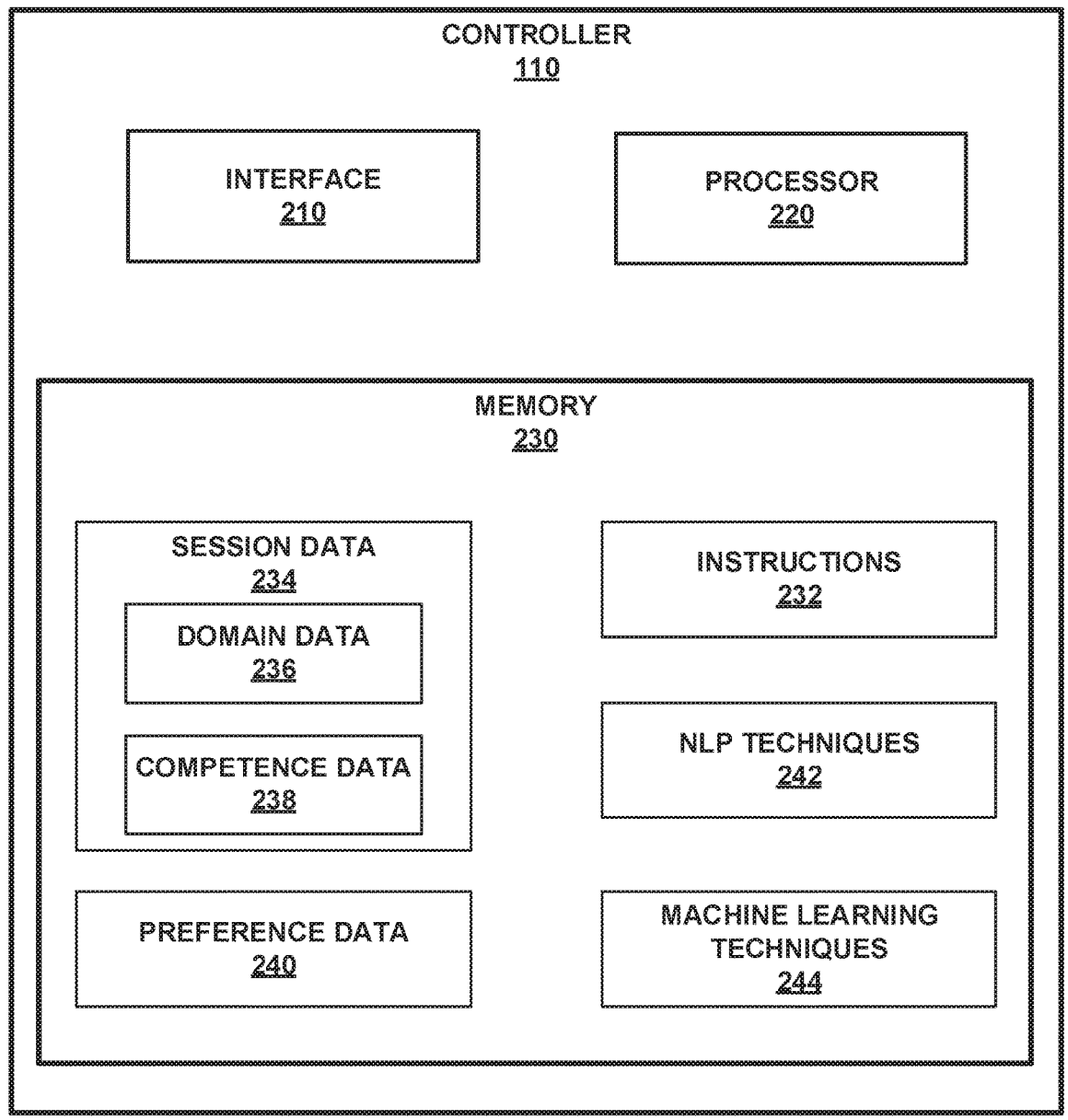
FIG. 2 depicts a conceptual box diagram of example components of the controller of FIG. 1.

As described above, controller 110 may include computing system 200 with a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, databases 130, software applications 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage domain competence of a user during a session. Controller 110 may utilize processor 220 to thusly manage domain competence. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage domain competence.

Processor 220 may manage domain competence according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage domain competence as described herein according to instructions 232 of one or more applications (e.g., software applications) stored in memory 230 of controller 110.

In addition to instructions 232, in some examples gathered or predetermined data or techniques or the like as used by processor 220 to manage domain competence of a user during a session as described herein may be stored within memory 230. For example, as depicted in FIG. 2, memory 230 may include session data 234, which includes domain data 236 and competence data 238. Session data 234 may include data on each database 130 accessed by user device 120 and each software application 140 utilized by user device 120. Session data 234 may further identify a specific user of the session and/or dates and times of the session. Domain data 236 may include data that the user consumed via user device 120 during the session. This may include written text data, spoken text data (converted by controller 110 via speech-to-text techniques), image data (e.g., medical diagrams, chemical structures, circuit diagrams), or the like. Competence data 238 may include data gathered by system 200 in order to determine a competence of the user. This may include data on how frequently a user looked up terms of the media during the session, whether these terms were advanced or rudimentary, how long it took a user to consume data on a topic (e.g., as compared to a baseline of the user for other topics), how calm or agitated the user is during the session, what portions of the domain data the user is focusing on (e.g., rudimentary or advanced) as captured by cursor activity and/or eye gaze of the user, or the like.

Further, memory 230 may include preference data 240. Preference data 240 may include preferences for how to display data and/or how to provide contextual data and/or advanced data as described herein. For example, preference data 240 may include preferences on how low a threshold competence is at which controller 110 provides contextual data, and/or how high a threshold competence is at which controller 110 provides advanced data (and/or hides remedial data). In some examples, preference data 240 may include data on what kind of contextual data and/or advanced data the user prefers to view, and/or how the user prefers to view it (e.g., as a pop up, transposed over the original text, provided automatically, provided in response to a user request, etc.).

Memory 230 may further include NLP techniques 242. NLP techniques 242 can include, but are not limited to, semantic similarity, syntactic analysis, and ontological matching. For example, in some embodiments, processor 220 may be configured to parse text that is consumed (e.g., read or listened to) by user via user device 120 to determine semantic features (e.g., word meanings, repeated words, keywords, etc.) and/or syntactic features (e.g., word structure, location of semantic features in headings, title, etc.) of this text. Ontological matching could be used to map semantic and/or syntactic features to a particular topic. The concept can then be used to determine the domain of the session. In this way, using NLP techniques 242, controller 110 may, e.g., identify a context of a data being consumed by the user to therein identify the domain of the session.

Memory 230 may further include machine learning techniques 244 that controller 110 may use to improve a process of managing domain competence of a user during a session as discussed herein over time. Machine learning techniques 244 can comprise algorithms or models that are generated by performing supervised, unsupervised, or semi-supervised training on a dataset, and subsequently applying the generated algorithm or model to manage domain competence.

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
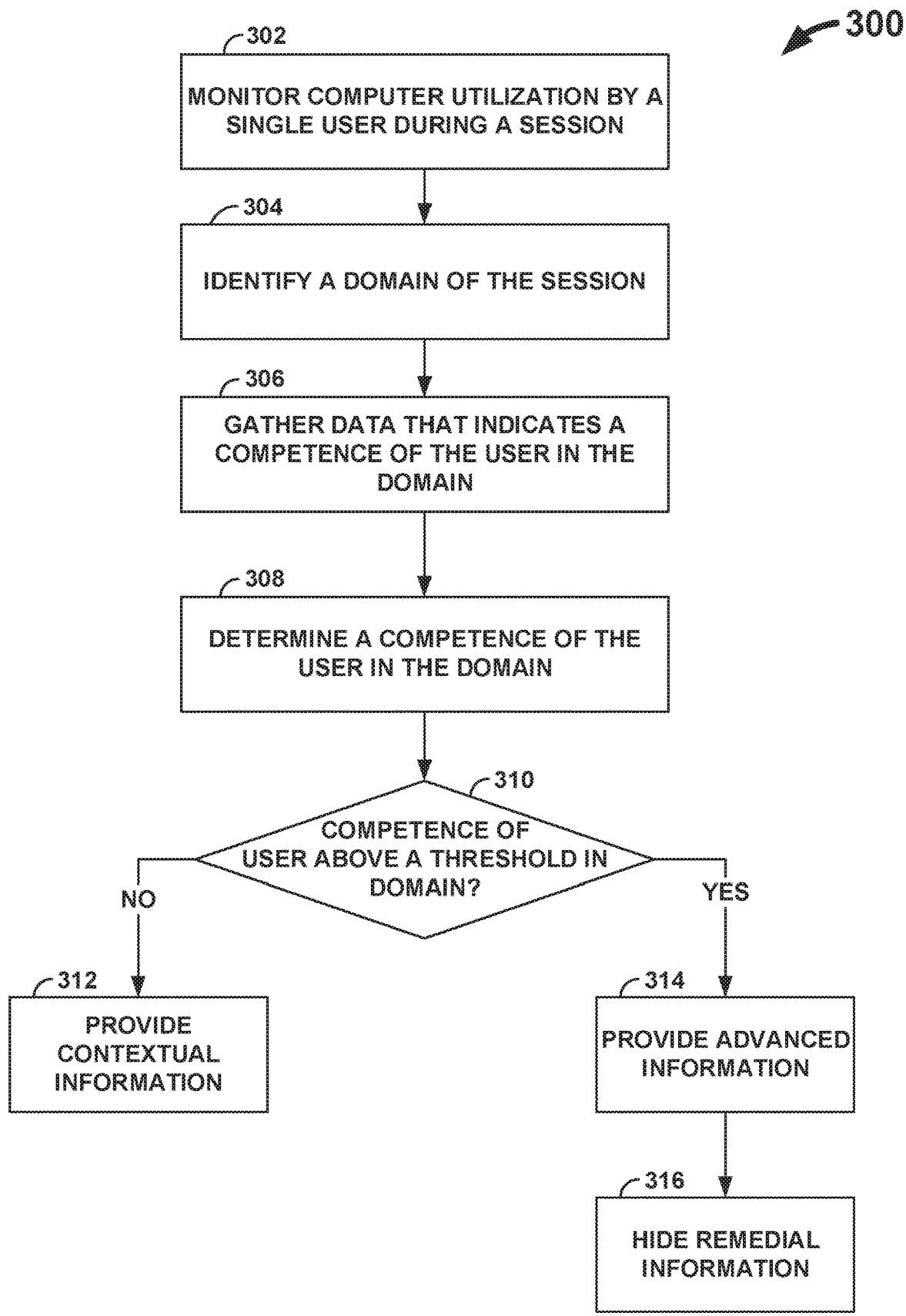
FIG. 3 depicts an example flowchart by which the controller of FIG. 1 may identify a domain and competence level of a user.

Using these components, controller 110 may manage domain competence of a user during a session as discussed herein. For example, controller 110 may manage domain competence according to method 300 of flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples controller 110 may execute a different method 300 than the flowchart of FIG. 3, or controller 110 may execute a similar method 300 with more or less steps in a different order, or the like.

Method 300 may begin by controller 110 monitoring utilization of user device 120 during a session (302). Controller 110 may monitor utilization via how user device 120 accesses one or more databases 130 and/or utilizes one or more software applications 140. Though databases 130 and software applications 140 are depicted as remote from user device 120 in environment 100, in other examples controller 110 may monitor utilization of locally stored databases 130 and/or software applications 140.

Controller 110 may identify a domain of the session (304). Controller 110 may identify a domain of a language, a topic (e.g., Shakespearean literature), an area of technical expertise, or the like. In some examples, controller 110 may identify two or more domains of a session. For example, controller 110 may identify a domain of English and a domain of semiconductors within a single session.

Controller 110 may gather competence data on the user (306). This data may include how frequently the user accesses reference materials related to the domain. These reference materials may include dictionaries, online repositories related to the domain, or the like. In some examples, this competence data may include data on how the user consumes data within the domain. For example, this may include how long a user takes to scroll past (and presumably consume) advanced data and/or rudimentary data. In other examples, this may include whether or not the user highlights advanced and/or rudimentary terms within the domain, and/or hovers over advanced and/or rudimentary terms to bring up tips embedded within the database 130 and/or software application 140.

In some examples, controller 110 may gather competence data from IoT devices around the user while user utilizes user device 120. For example, controller 110 may gather visual data from a webcam to determine whether or not facial data on user is stressed or relaxed. For another example, controller 110 may gather heartbeat data from a smart watch of the user to determine if a user is agitated (where an agitation may reflect a relatively low level of competence). For another example, controller 110 may gather audible data from user to determine is the user is saying things that reflect a low level of competence (e.g., "what in the world does this mean?") or a high level of competence (e.g., "yes of course, but that is old news—what are people saying today?").

Controller 110 may determine a competence level of the user (308). For example, controller 110 may synthesize all of the competence data to determine the competence level. In some examples, controller 110 may compare competence data from user to one or more online resources to determine a competence level of the user. For example, controller 110 may compare terms that the user does or doesn't look up against university courses, online textbooks, or other public or private metrics to determine a competence level of the user.

Controller 110 determines whether or not a competence level of the user is above a threshold level within the domain (310). In some examples, the threshold level indicates an average amount of competence for users that operate within that domain on a daily rate. For example, the threshold level could be an amount of competence within a language that equates to people that speak in that language daily. For another example, the threshold level could include an amount of competence that is held by people who studied that topic in college or work in that area of expertise for a career. In some examples, controller 110 may determine whether or not the user is above or below numerous levels of competence, where a lower level of competence indicates that the user requires help in the area, a higher level of competence indicates that the user has mastery within the area, and a competence between these two levels indicates that the subject matter should be provided to the user without modification. In some examples, controller 110 may dynamically recalculate these threshold levels (and the user's identified competence level) over time via machine learning techniques as described herein based on how users continue to consume data as managed by controller 110

Where controller 110 determines that the user has less than a threshold amount of competence, controller 110 may provide contextual information to the user (312). This contextual information may include translations of one or more words, where the domain is a non-primary language for the user. The contextual information may also include definitions, or alternate theories, or synonyms, or the like.

Where controller 110 determines that the user has more than a threshold amount of competence, controller 110 may provide advanced information to the user (314). This advanced information may include more accurate or nuanced terms or information, where controller 110 detects that the source is otherwise providing generic or nonspecific terms. For example, controller 110 may update a caption that says "this is a picture of doctors performing an operation on an artery of the heart" to "this is a picture of doctors performing an operation on the circumflex branch of the left coronary artery" in response to detecting that the user has a relatively high competence level in the medical domain of the caption. In some examples, controller 110 may also hide some or all remedial information (316). Controller 110 may hide remedial information by making the remedial information not visible in a display of user device 120. Alternatively, or additionally, controller 110 may gray-out or strike through remedial information so that user may quickly identify remedial information and therein skip past it.

Controller 110 may identify a competence level of the user and therein identify remedial and/or advanced information for the user that matches that competence level in a plurality of ways. For example, controller 110 may isolate a competence level of the user as associated to one or a plurality of terms that were looked up by user, focused on by user, or otherwise appear to be at the edge of understanding of the user. Further, controller 110 may organize some or all of the data within the full corpora of all of databases 130 and software applications 140 (which together may make up the full CDN). Specifically, controller 110 may organize data of the CDN from most remedial to most advanced. For example, controller 110 may produce two groups of N number of data points of the corpora by resampling text into groups:

$S_1, S_2, \ldots S_N$; and $T_1, T_2, \ldots T_N$.

Once divided into these two groups, controller 110 may determine if frequency of the one or plurality of words that identify the edge of understanding of the user is within Si and Ti of the following equation:

$$p_1 = \frac{\sum_{i=1}^{N} H(freq(q, S_i) \le freq(q, T_i))}{N}, H(x \le y) = \begin{cases} 1, & x < y \\ 0.5, & x = y \\ 0, & x > y \end{cases}$$

In some examples, the frequency may be within Si and Ti if the auto encoder of q of the equation is within a predetermined tolerance of each word in Si and Ti. Controller 110 may determine this predetermined tolerance by the aforementioned dwell time on content, the consumption speed, or other such competence data. For example, the more the competence data indicates a higher competence, the lower the tolerance may be.

Once controller 110 runs the above equation, controller 110 may determine the p-value of one or some or all words. For example, controller 110 may determine the p-value of all words with the following equation:

$$p_2 = \frac{1 + N \cdot 2 \cdot \min(p_1, 1 - p_1)}{1 + N}$$

Controller 110 may rank these p-values from lowest to highest, with all words with a value higher than, e.g., 0.05 accepted as possible input that controller 110 may provide. Controller 110 may then use these scores to determine what text the user may consume via user device 120 on CDN. In other examples, controller 110 may analyze p-values using calculations that are far more fine-grained than these provided calculations. For example, controller 110 may start with these relatively coarse calculations to begin the process of domain competence management, subsequently refining an approach over time using machine learning techniques as described herein, thusly updating and improving these calculations with usage.

As described herein, in many examples controller 110 may manage domain competence of media delivered across a CDN. For example, this CDN may include a large amount of data stored in a cloud environment. Further, in some examples controller 110 may be integrated into a management module of the CDN. The structure of this CDN may be reflected in the cloud environment figures of FIGS. 4 and 5.

Figure 4:
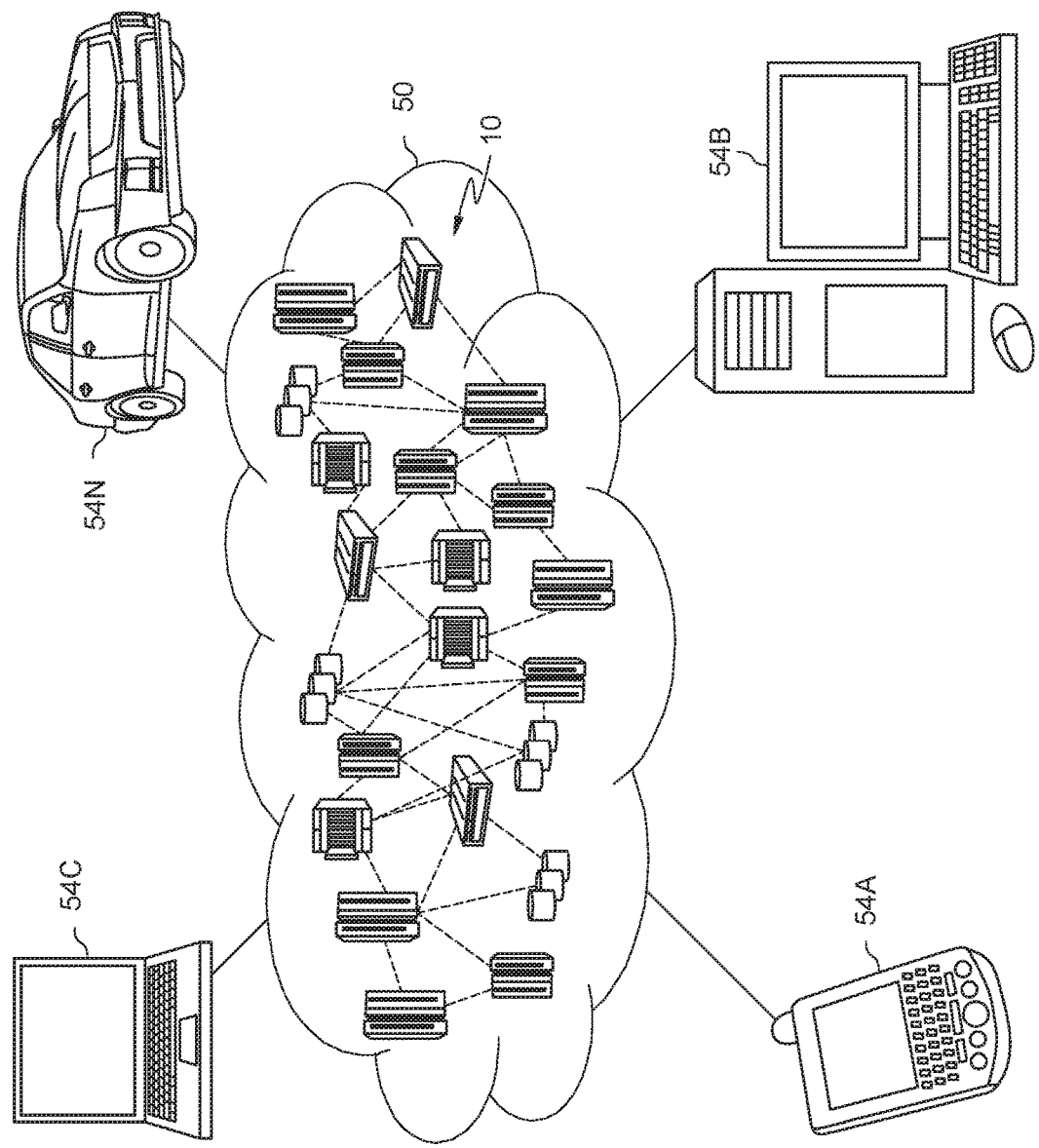
FIG. 4 illustrates a cloud environment, consistent with some embodiments.

FIG. 4 illustrates an embodiment of a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3 resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
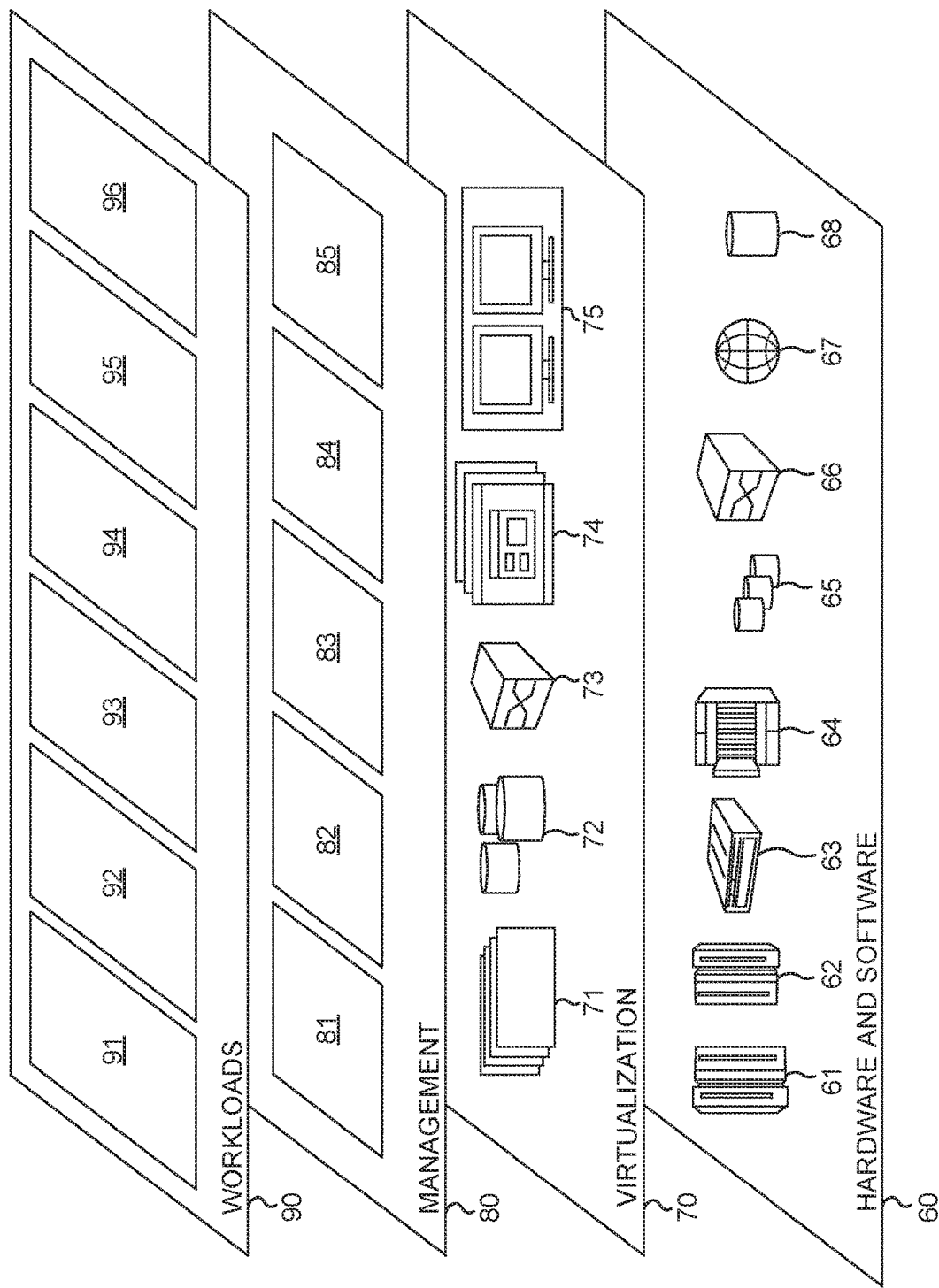
FIG. 5 illustrates a set of functional abstraction layers provided by cloud computing environment, consistent with some embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain management 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
gathering utilization data of a computer by a user during a session;
identifying a webpage which the user is accessing via the computer during the session as reflected by the utilization data, wherein the webpage is configured to deliver static information regarding a domain;
gathering competence data on how competent the user is with the domain, wherein the competence data relates to how the user interacts with the computer during the session;
determining a competence level of the user for the domain based on the competence data; and
modifying content of the static information within the webpage that relates to the domain within the webpage presented to the user based on the determined competence level, wherein modifying the content of the static information further comprises causing the computer to present contextual information into the session in response to determining that the competence level is below a threshold, and wherein the contextual information is associated with the static information.

2. The computer-implemented method of claim 1, wherein modifying the content further comprises causing the computer to present advanced information into the session in response to determining that the competence level is above a threshold.

3. The computer-implemented method of claim 1, wherein modifying the content further comprises causing the computer to hide remedial information during the session in response to determining that the competence level is above a threshold.

4. The computer-implemented method of claim 1, wherein gathering utilization data on how the user utilizes the computer includes identifying webpages accessed by the user.

5. The computer-implemented method of claim 1, wherein gathering utilization data on how the user utilizes the computer includes identifying software applications accessed by the user.

6. The computer-implemented method of claim 1, wherein the domain includes a language.

7. The computer-implemented method of claim 1, wherein the domain does not relate to a language.

8. The computer-implemented method of claim 1, wherein gathering competence data includes gathering data on how often the user utilizes a dictionary regarding the domain.

9. The computer-implemented method of claim 1, wherein modifying the content further comprises causing the computer to translate portions of the utilization data from the domain of the session into a preferred domain of the user during the session in response to determining that the competence level is below a threshold.

10. A system comprising:
a processor; and
a memory in communication with the processor, the memory containing instructions that, when executed by the processor, cause the processor to:
gather utilization data of a computer by a user during a session;
identify a webpage which the user is accessing via the computer during the session as reflected by the utilization data, wherein the webpage is configured to deliver static information regarding a domain;
gather competence data on how competent the user is with the domain, wherein the competence data relates to how the user interacts with the computer during the session;
determine a competence level of the user for the domain based on the competence data; and
modify content of the static information that relates to the domain within the webpage presented to the user based on the determined competence level, wherein the content of the static information is modified by causing the computer to present contextual information into the session in response to determining that the competence level is below a threshold, and wherein the contextual information is associated with the static information.

11. The system of claim 10, the memory further containing instructions that, when executed by the processor, cause the processor to modify the content by presenting advanced information into the session and hide remedial information during the session in response to determining that the competence level is above a threshold.

12. The system of claim 10, wherein:
gathering utilization data on how the user utilizes the computer includes at least one of identifying webpages accessed by the user or identifying software applications accessed by the user; and
the domain does not relate to a language.

13. The system of claim 10, wherein gathering competence data includes gathering data on how often the user utilizes a dictionary regarding the domain.

14. A computer program product, the computer program product comprising a computer readable storage medium having program instructions embodied therewith, the program instructions executable by a computer to cause the computer to:
gather utilization data of a computer by a user during a session;
identify a webpage which the user is accessing via the computer during the session as reflected by the utilization data, wherein the webpage is configured to deliver static information regarding a domain;

gather competence data on how competent the user is with the domain, wherein the competence data relates to how the user interacts with the computer during the session;

determine a competence level of the user for the domain based on the competence data; and modify content of the static information that relates to the domain within the webpage presented to the user based on the determined competence level, wherein the content of the static information is modified by causing the computer to present contextual information into the session in response to determining that the competence level is below a threshold, and wherein the contextual information is associated with the static information.

15. The computer program product of claim 14, the computer readable storage medium further containing instructions that, when executed by the computer, cause the computer to modify the content by presenting advanced information into the session and hide remedial information during the session in response to determining that the competence level is above a threshold.

16. The computer program product of claim 14, wherein:
gathering utilization data on how the user utilizes the computer includes at least one of identifying webpages accessed by the user or identifying software applications accessed by the user; and
the domain does not relate to a language.

17. The computer program product of claim 14, wherein gathering competence data includes gathering data on how often the user utilizes a dictionary regarding the domain.

* * * * *